(No Model.)

W. AIKEN.
Straight Knitting Machine.

No. 233,061.        Patented Oct. 12, 1880.

5 Sheets—Sheet 1.

Witnesses.
S. N. Piper
Wm. W. Lunt

Inventor.
Walter Aiken.
by attorney
R. H. Eddy (No Model.)   W. AIKEN.   5 Sheets—Sheet 2.
Straight Knitting Machine.
No. 233,061.   Patented Oct. 12, 1880.

Witnesses
S. N. Piper
Wm W. Lyent

Inventor
Walter Aiken,
by attorney
R. H. Eddy (No Model.) 5 Sheets—Sheet 3.
W. AIKEN.
Straight Knitting Machine.
No. 233,061. Patented Oct. 12, 1880.
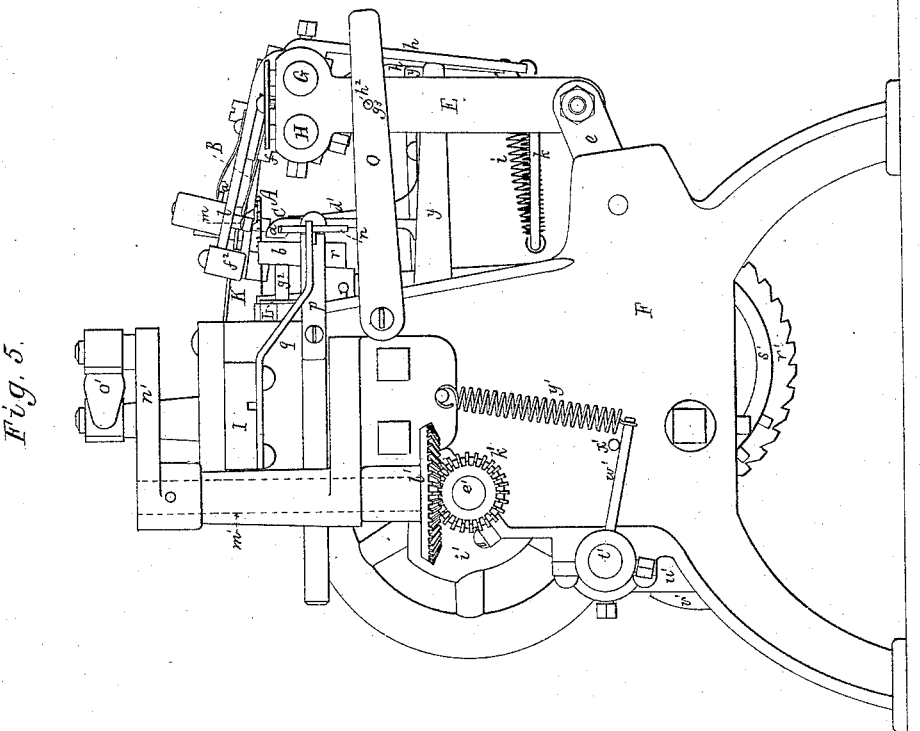
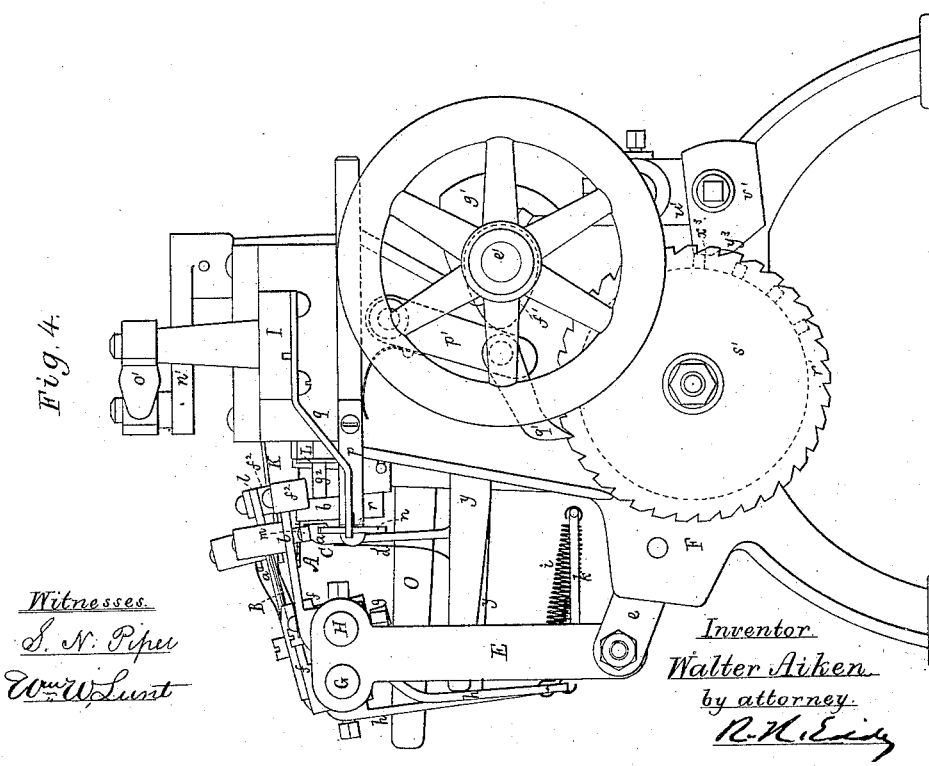
Witnesses
S. N. Piper
Wm W Lunt
Inventor
Walter Aiken
by attorney
R. H. Eddy (No Model.) 5 Sheets—Sheet 4.
W. AIKEN.
Straight Knitting Machine.
No. 233,061. Patented Oct. 12, 1880.
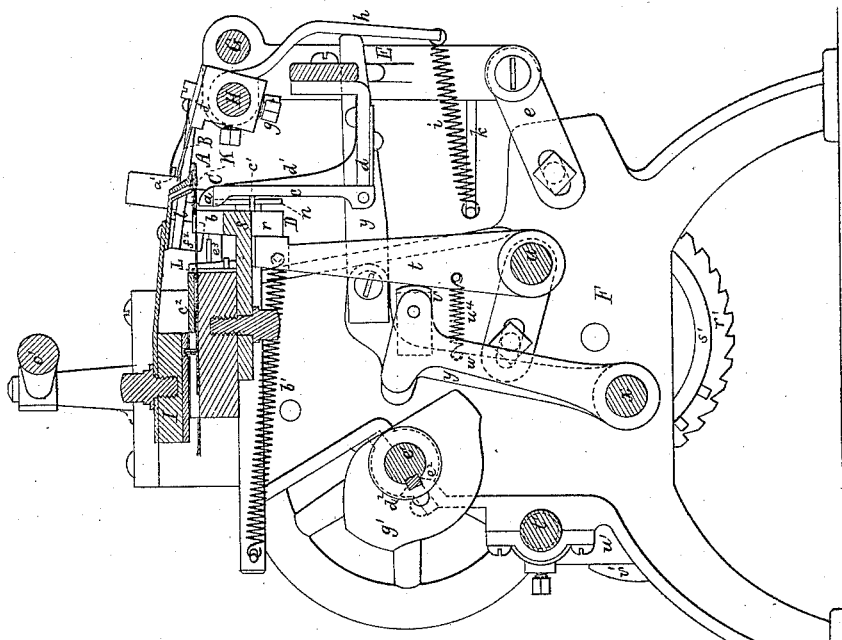
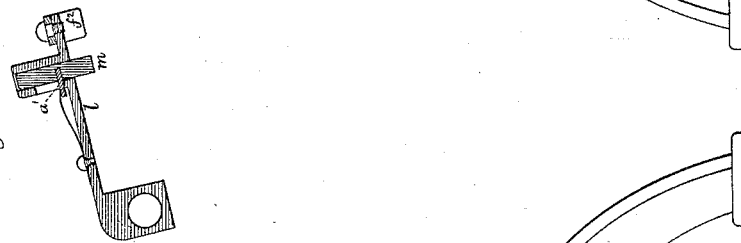
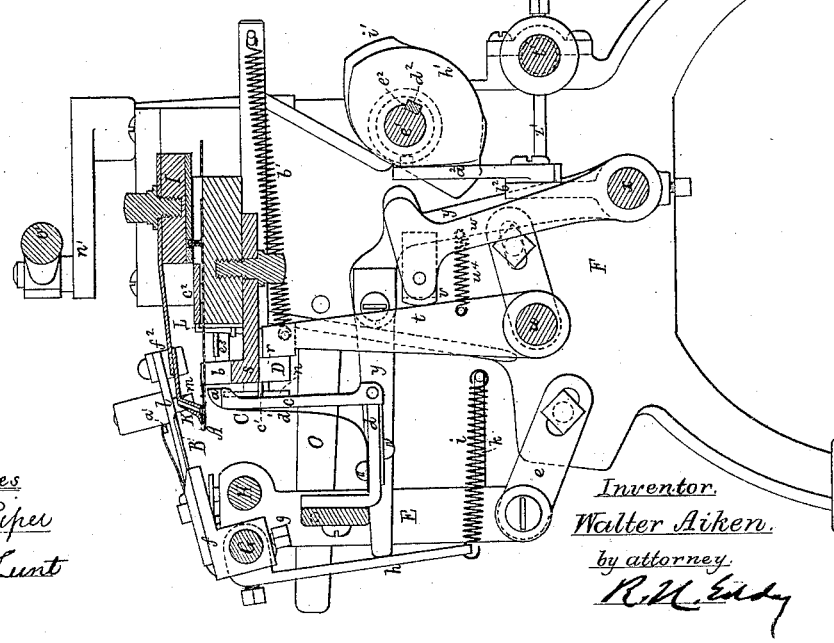
Witnesses
S. N. Piper
Wm W Lunt
Inventor.
Walter Aiken.
by attorney
R. H. Eddy

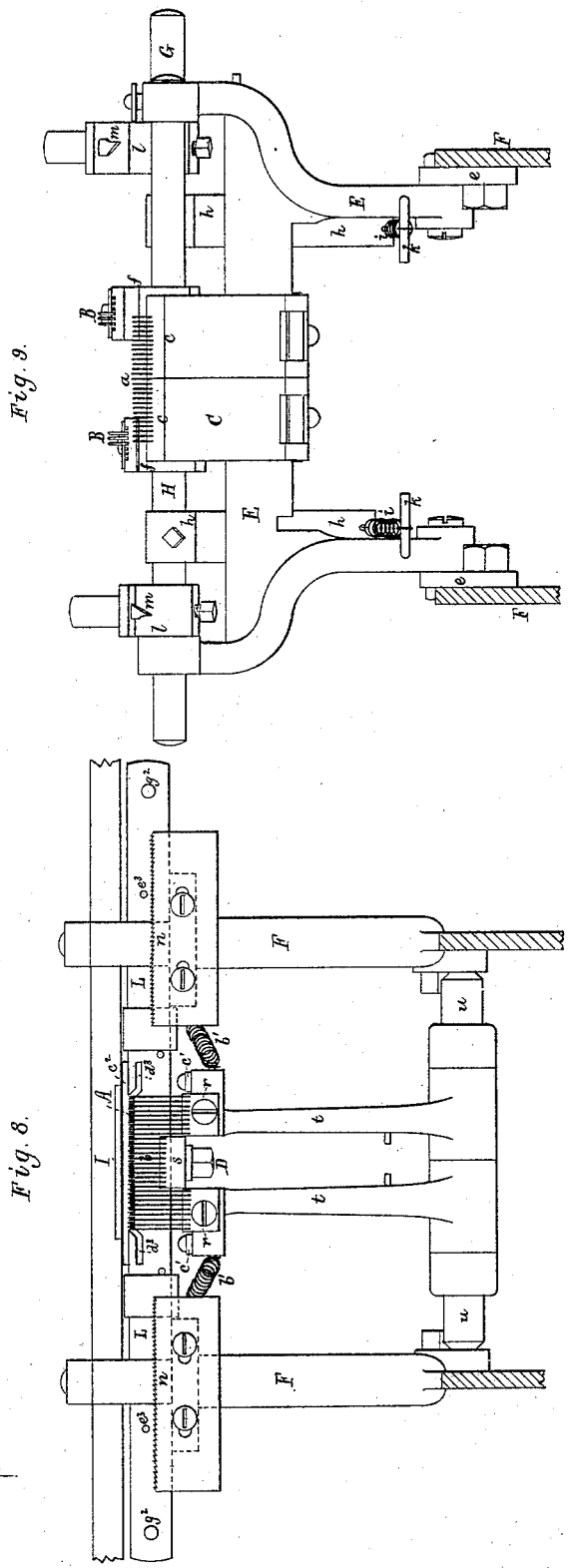

UNITED STATES PATENT OFFICE.

WALTER AIKEN, OF FRANKLIN, NEW HAMPSHIRE.

STRAIGHT-KNITTING MACHINE.

SPECIFICATION forming part of Letters Patent No. 233,061, dated October 12, 1880.

Application filed April 30, 1880. (No model.)

*To all whom it may concern:*

Be it known that I, WALTER AIKEN, of Franklin, in the county of Merrimack and State of New Hampshire, have invented a new and useful Improvement in Straight-Knitting Machines; and I do hereby declare the same to be described in the following specification and represented in the accompanying drawings, of which—

Figure 1:
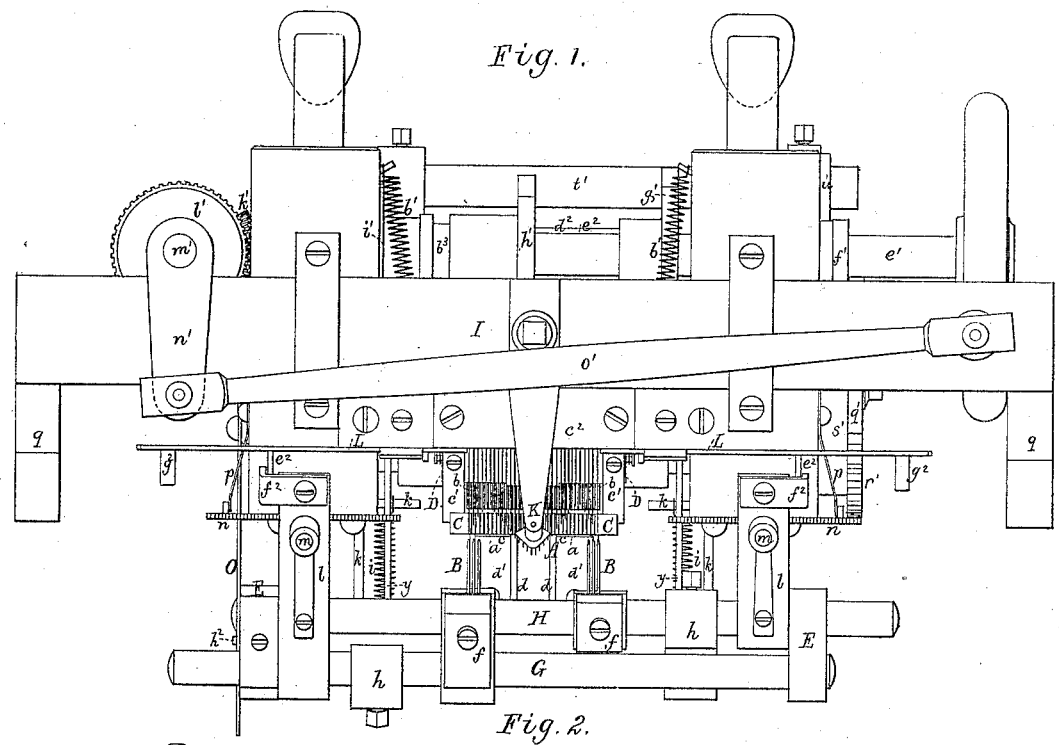
Figure 2:
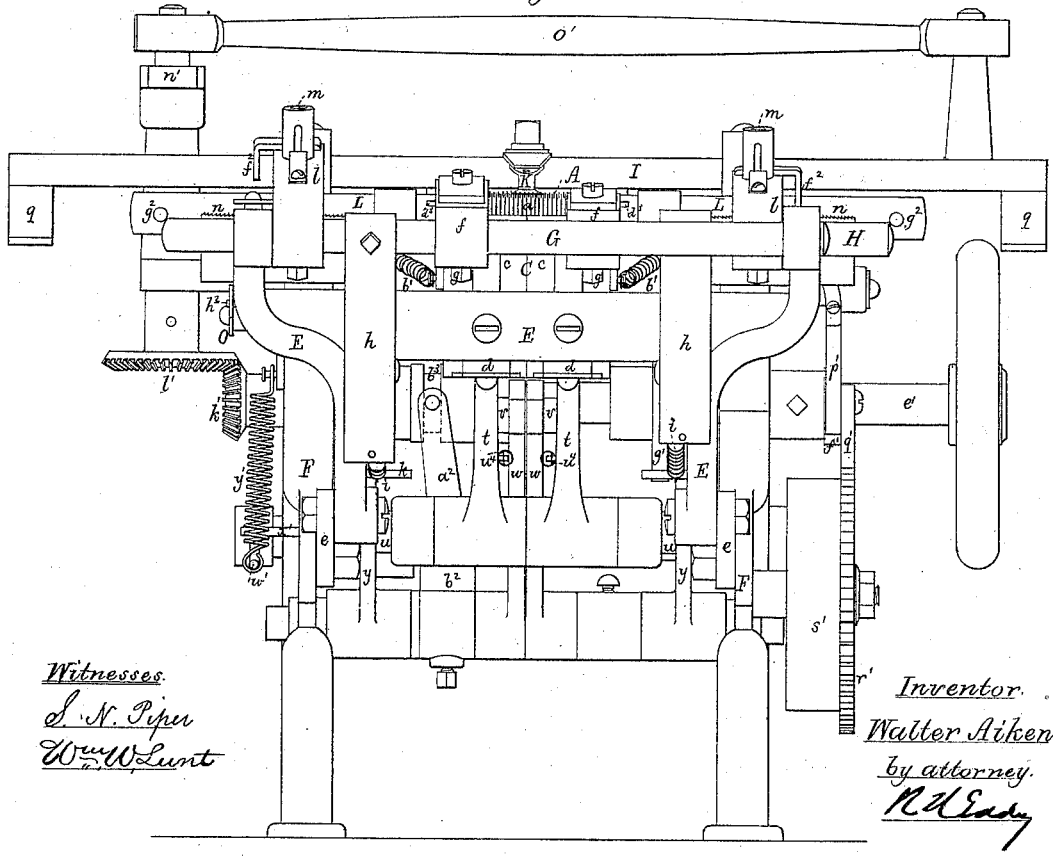
Figure 3:
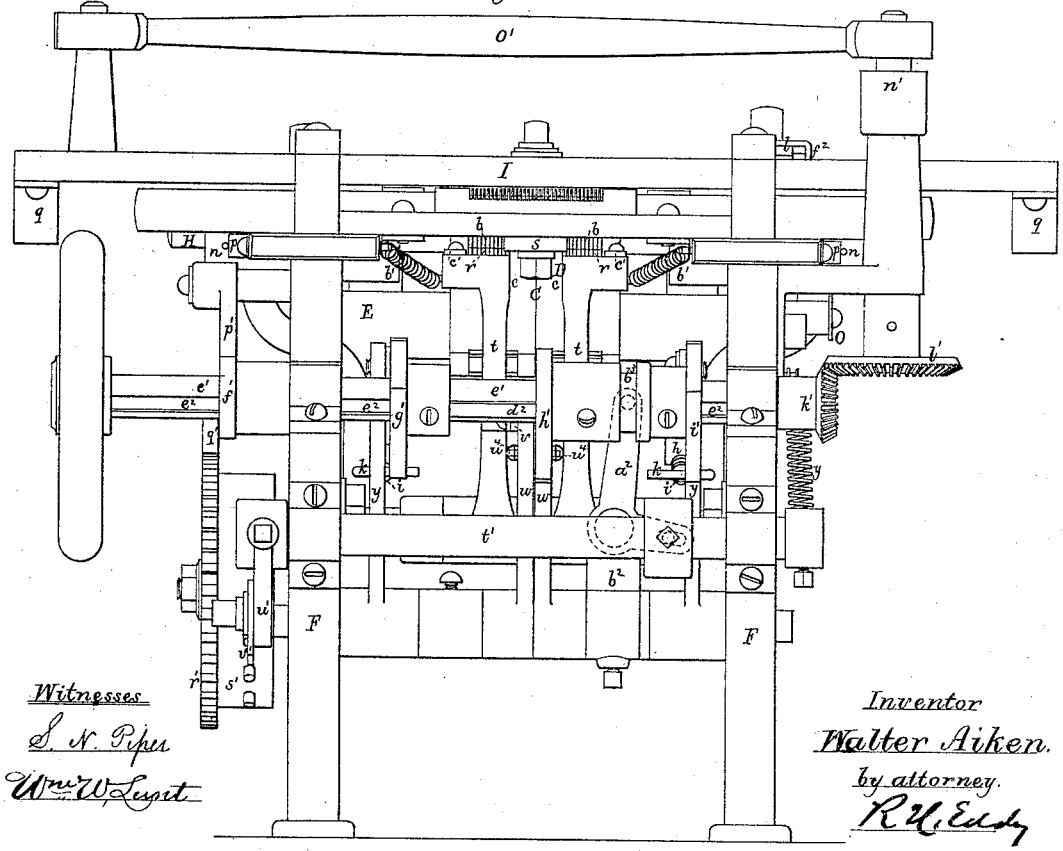

Figure 1 is a top view, Fig. 2 a front elevation, Fig. 3 a rear elevation, Figs. 4 and 5 opposite end views, and Figs. 6 and 7 transverse medial sections, of the machine embodying my invention, the said sections being made to exhibit the mechanism on opposite sides of the plane of section common to both views. Figs. 8 and 9 are vertical sections taken lengthwise of the machine and between the two sets of sinker-bar sections, one of such figures showing the two front sinker-bar sections and various parts adjacent thereto, and the other the three rear sinker-bar sections, as well as sundry parts in the vicinity thereof.

One characteristic of this machine, by which it differs from others heretofore in use of the kind, is that its front sinker-bar is made in two movable sections and the rear sinker-bar in three sections, two only of which—viz., the outside ones—are movable, the intermediate one being stationary, such being to aid in effecting the narrowing of the work at its opposite edges alternately.

My improvement enables one to produce a straight-knitting and narrowing machine quite simple in construction and capable of very rapid operation, comparatively speaking.

The nature of my invention is fully set forth in the claims hereinafter presented, it not being my purpose to claim a latch-needle knitting-machine that will knit and narrow the fabric and be provided with two sets of sinkers, and also with mechanism for moving certain of the needles up and down to throw them into and out of operation at certain times, such being shown in the patent granted on July 29, 1856, to John Nesmith; nor is it my purpose to claim, broadly, a machine by which narrowing at one edge of the fabric produced is being effected while knitting is being carried on at the other edge of such fabric, such being shown in the patent to Charles H. Young, No. 222,619, December 16, 1879.

In the above-mentioned drawings, A denotes the series of latched needles, and B B the two sets of transferring-points. C is the front sinker-bar, and D the rear one, each being provided, as usual, with a series, $a$ or $b$, of sinkers. The said front sinker-bar is made in two halves or sections, $c\ c$, each of which, at its lower part, is pivoted to one of two projections, $d\ d$, that extend inward from a vibratory frame, E, that is pivoted at its lower part or parts to arms $e$, projecting from the main frame F, in manner as represented. There is applied to the said vibratory frame E two rotary slide-rods, G H, each being adapted to the frame in a manner to admit of being slid lengthwise therein, and also of being revolved axially in order, to effect the necessary movements of the transferring-points relatively to the needles. Each set of the said transferring-points projects from a block or carrier, $f$, adapted to one of the slide-rods, so as to be movable lengthwise thereof or revolved on it, such carrier being provided with a screw, $g$, for clamping it to the rod. Furthermore, from each of the said rods there projects downward one of two arms, $h\ h$. (See Figs. 2, 6, and 7.) From the lower part of each of the said arms a helical spring, $i$, extends, and is connected to a projection, $k$, from the vibratory frame E, the springs being to effect counter rotary movements of the slide-rods. There also extends from each of the rods, in manner as represented, one of two other arms, $l\ l$, each of which carries a toothed slider, $m$, provided with a spring to force it downward to its lowest position, (determined by a shoulder, $a'$, on the slider,) such arm, spring, and slider being represented in longitudinal section in Fig. 10. Each toothed slider is situated immediately over, and is to engage with, one of two toothed slide-racks, $n$, arranged as represented, each of such racks being applied to the main frame, so as to be movable a short distance longitudinally. To the main frame and to each rack a spring, $p$, is adapted to effect retraction of the rack, the forward movement of the rack—that is, toward the needles—being produced by one of two arms, $q$, projecting from the movable cam-bar I, in manner as shown.

As the cam-bar reciprocates rectilinearly the racks will be alternately forced inward, and in so doing will, by engagement with the toothed sliders, alternately move or slide lengthwise the slide-rods G H of the transferring-points, whereby the said points will be moved inward.

The mechanism for moving the transferring-points downward relatively to the needles will be hereinafter described.

The rear sinker-bar, D, is divided into three sections, $r\ s\ r$, the middle one, $s$, of which is stationary and projects from the main frame. Each of the outer sections is carried by one of two arms, $t$, extending upward from and pivoted on a stationary shaft, $u$. (See Figs. 6, 7, and 9.) The arms $t$, by means of springs $u^4$, are drawn against projections $v\ v$ from two other arms, $w$, extending from a cross-shaft, $x$. Two more arms, $y$, pivoted to the said cross-shaft, and formed as represented in Figs. 6 and 7, project and bear at their ends against the inner inclined sides of the arms $h$ of the slide-rods G H of the transferring-points.

Springs $b'$, attached to the main frame, and the two outer sections, $r$, of the rear sinker-bar, serve to effect retraction of the said sections at the proper times. The said two sections $r$ have projections $c'$ extending from them to and against the two sections of the front sinker-bar, there being to these latter sections springs $d'$, to press them up to the projections $c'$.

The cam-shaft shown at $e'$ is provided with four cams, $f'\ g'\ h'\ i'$, and a bevel-gear, $k'$, which are arranged upon such shaft in manner as represented. The said gear engages with another bevel-gear, $l'$, fixed on the lower end of a vertical shaft, $m'$. A crank, $n'$, fixed to the upper end of the shaft $m'$, is connected with the cam-bar I by a connecting-rod, $o'$, which causes, when the cam-shaft is revolved, the reciprocating movements of the cam-bar.

The cam $f'$ acts against a vibratory arm, $p'$, carrying a pawl, $q'$, that engages with the ratchet-wheel $r'$ of a pattern-wheel, $s'$.

At the rear part of the frame F is a shaft, $t'$, upon which, near one end of it, is an arm, $u'$, to which there is fixed a plate, $v'$, of proper form, as shown, to bear against and be actuated by the pins of the pattern-wheel, such wheel being and to operate like that shown in Letters Patent granted to me June 11, 1878, June 25, 1878, and June 3, 1879. From the shaft $t'$, at its opposite end, there projects an arm, $w'$, which is held up to a stationary stud, $x'$, by a spring, $y'$, all being arranged as represented. The said spring $y'$, by drawing the arm $w'$ against the stud $x'$, restores the shaft to its normal position.

From the shaft $t'$ an arm, $z'$, extends forward into a slot in the lower arm of a right-angular or elbow lever, $a^2$, arranged as shown, and pivoted to a short stationary arm, $b^2$, extending up from the shaft $x$. From the upper arm of the lever $a^2$ a stud projects into a groove, $b^3$, formed in and around the hub of the cam $h'$, said mechanism, together with the arm $w'$, steps of the plate $v'$, and pins of the pattern-wheel, serving to slide the cams $g'\ h'\ i'$ on their shaft at the proper time and the required distance.

The three cams $g'\ h'\ i'$ have their hubs connected by a spline or bar, $d^2$, which extends from one to the other of them and into a groove, $e^2$, made lengthwise in the shaft $e'$, from which it will be seen that the cams are so connected with the shaft and each other as not only to be revolved simultaneously with and by the shaft, but to be capable of moving simultaneously on such shaft lengthwise thereof by means of the mechanism described in the next preceding paragraph.

The cam $h'$ is to work against either of the arms $w$, in order to move it forward and cause a corresponding forward movement of its back sinker-bar section, which, by means of the extension $c'$ from it to the front sinker-bar section, will create in the latter a like forward movement.

The cams $g'\ i'$ are to alternately operate or move forward the arms $y$, in order to effect the rotary motions of the slide-rods G H for depressing the sets B of transferring-points or moving them down to the needles.

Figures 12, 13:
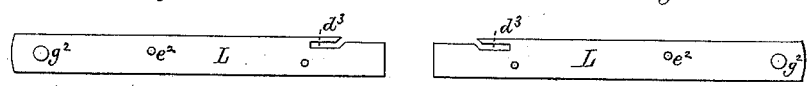
Figure 11:
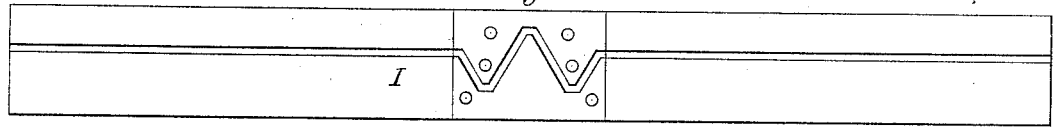

Fig. 11 is an under-side view of the cam-bar, showing its cammed groove for operating the needles when properly arranged and supported so as to be capable of moving longitudinally, in the usual manner. Extending forward from the middle of the cam-bar is the yarn-carrier K, and there is applied to the front edge of the cap-plate $c^2$, and with respect to the needles in manner as shown, two slotted slides, L, front views of which are given in Figs. 12 and 13. Each of these slides L has a slot, $d^3$, made in it, as represented, for the purpose of depressing some of the needles when the slide is moved forward or toward the middle of the machine. Each slide L has a stud, $e^2$, projecting from it, there being to the next adjacent arm, $l$, a projection, $f^2$, which extends down from such arm $l$ in manner as shown, and, by acting against the stud $e^2$ when the arm $l$ is down and moving laterally, moves the said slide inward to effect depression of the needles—that is to say, those from which the loops may have been removed by the narrowing-points—the object being to move down to a position where it cannot receive yarn from the yarn-carrier each needle from which the loop of yarn may have just previously been taken by a transferring-point. To enable this to be done, such of the needles as are to be used in narrowing with the transferring-points are to be in grooves of sufficient depth or proper form to allow of their being so depressed, such needles, when in their highest positions, resting upon the upper edges of the slides L. Each of the said slides has a knob, $g^2$, projecting from it, to enable a person to draw back the slide as occasion may require.

The last-described mechanism I do not claim, as it is shown in the hereinbefore-mentioned patent to John Nesmith.

There is pivoted to the main frame, at one end thereof, a spring-latch, O, provided with a hole, $g^3$, to receive a stud, $h^2$, projecting from the vibratory frame E. This latch and the stud are to hold the said frame E up in its elevated position, and to enable it to be turned forward and down in order to carry the front sinker-bar sections away from the needles and the rear sinker-bar sections, as may be required.

On the driving-shaft being put in revolution, the cam-bar will be reciprocated, so as to cause its cam to move out the needles, yarn being fed to them in the usual manner by the yarn-carrier. On the cam-bar approaching the termination of each movement of it, one of the arms $q$ projecting from such bar will be carried against one of the slide-racks $n$, and will move it inward lengthwise a short distance, the rack remaining stationary while the arm may next retreat. The racks are thus moved alternately and intermittently by the cam-bar and its arms, whether the narrowing of the fabric may or may not be in the act of being done. In case of it being required to have the narrowing accomplished, the toothed slides will be in engagement with the racks, whereby the narrowing-points will have imparted to them by the racks and slide-rods corresponding movements laterally, to enable them to transfer to other needles the loops taken up by and upon such points. In the meantime the slide L, for depressing the needles from which the loops may have been thus removed, will be advanced far enough to effect the downward movements of such needles.

The carriers of the transferring-points, as well as those of the toothed slides which actuate the slide-racks, can be adjusted both laterally and vertically, or radially, on their slide-rods, and on such being done they can be clamped in their positions by their set-screws.

The pattern-wheel in revolving will carry its pins consecutively against the plate $v'$, and the intermediate mechanism will cause the three cams $g'$ $h'$ $i'$ to be moved endwise on their shaft sufficiently for the cams $g'$ and $h'$ to be carried into engagement with the arms $w$ and $y$, that are on one side of the middle of the machine, a further movement of the pattern-wheel pin against the plate $v'$ in due time causing, through the intervening mechanism, the cams $h'$ and $i'$ to be moved still farther along, or so as to come against the other arms $w$ and $y$, from which will follow the forward movements of the movable sinker-bar sections and the depression of the transferring-points in the order required.

The plate $v'$ has two steps, $x^3$ $y^3$, against which the pattern-wheel pin acts successively to effect the desired two rearward movements of the plate, said movements of the plate $v'$ serving to effect the sliding of the cams $g'$ $h'$ $i'$ on their shaft through the aid of the arm $u'$, shaft $t'$, arm $z'$, elbow-lever $a^2$, arm $b^2$, shaft $x$, and groove $b^3$, (such groove being in the hub of the cam $h'$,) constituting the intervening mechanism hereinbefore referred to.

The cam-groove of the cam-bar is to be properly constructed for operating the needles, not only to cause the loops on them to throw back the latches and rest upon them ready for receiving the narrowing-points, but to enable them to take the yarn from the yarn-carrier as may be required.

The work comes between the front and rear sections of the sinker-bars, one of the movable sections of the rear sinker-bar serving, when moved forward, to force upon the transferring-needles the loops to be transferred to them. The movable section of the front sinker-bar, in moving backward, transfers to the needles the loops on the transferring-points next to such section.

Figure 14:
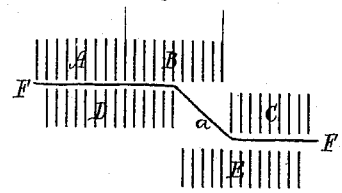

At first view it would seem that the rear sinker-bar, like the front one, might be divided into two sections only; but it becomes necessary for it to be constructed in three sections and to have the middle one stationary and the others movable, as described. The reason for this will be apparent on inspection of the diagram termed "Fig. 14," in which the positions of the sinkers are shown when the process of narrowing is taking place.

A, B, and C denote the sets of sinkers of the three sections of the rear sinker-bar, while D and E represent the sets of sinkers of the two divisions of the front sinker-bar, the fabric being shown at F F as extending between the sections of the two bars.

In consequence of the advance movement of two of the sections, C E, while the others, A B D, are at rest, the work would be torn or injured at its middle were there but two sections of the back sinker-bar; but there being three of them, and the middle one being stationary, and one of the outer side sections being moved forward with one of the sections of the front bar, the work becomes bent in the diagonal of a rectangle, in manner as shown at $a$, whereby it can stretch without being cut or broken.

Having thus described the machine containing my present invention, what I claim as such is as follows, viz:

1. The combination of the back stationary and movable sinker-bar sections, $r\ s\ r$, and the front movable sinker-bar sections, $c\ c$, arranged and provided with mechanism for operating the movable sections of the two sets, substantially as set forth.

2. The combination of the series of needles and the two sets of transferring-points, having mechanism for operating them, as described, with the stationary and movable sinker-bar sections, arranged as shown, and provided with mechanism for operating, in manner as explained, the movable sections of the said sinker-bars.

3. The combination for actuating the transferring-points, such consisting of the pattern-wheel $s'$, the operative cam $f'$, ratchet-wheel $r'$, pawl $q'$, auxiliary shaft $t'$, arms $w'\ z'$, stepped plate $v'$, slotted lever $a^2$, cam-shaft $e'$, connected cams $g'\ i'$, the arms $y\ y\ h\ h$, shaft $x$, springs $i$ $i$, rods G H, arms $l\,l$, toothed sliders $m\,m$, cam-bar I, arms $q$, slide-racks $n$, and springs $p$, all being arranged and adapted and to operate substantially as set forth.

4. The combination for actuating, as explained, the transferring-points and the movable sections of the sinker-bars, such consisting of the pattern-wheel $s'$, cam $f'$, ratchet-wheel $r'$, pawl $q'$, shaft $t'$, arms $u'\,z'$, stepped plate $v'$, slotted lever $a^2$, cam-shaft $e'$, connected cams $g'\,h'\,i'$, arms $y$, $h$, $w$, and $t$, shaft $x$, projections $v$, springs $i$ and $u^4$, rods G H, arms $l\,l$, toothed sliders $m\,m$, cam-bar I, arms $q$, slide-racks $n$, and springs $p$, all being arranged and adapted and to operate substantially as set forth.

5. The combination of the movable frame E and the front sinker-bar sections, $c\,c$, applied thereto, as described, with the main frame F and the middle or stationary sinker-bar section, $s$, supported thereby, and with the movable sinker-bar sections $r\,r$ and their sustaining-arms, all being substantially as explained.

6. The combination of the rods G H with the movable frame E and with the adjustable arms and transferring-point carriers applied to such arms, as set forth.

WALTER AIKEN.

Witnesses:
ALEXIS PROCTOR,
FRANK PROCTOR.